3,221,002
PROCESS FOR POLYMERIZATION UTILIZING A SURFACE TREATED INORGANIC SOLID CATALYST
Adam Orzechowski, Waltham, and James C. MacKenzie, Wellesley Hills, Mass., assignors to Cabot Corporation, Boston, Mass., a corporation of Delaware
No Drawing. Filed Sept. 26, 1963, Ser. No. 311,651
The portion of the term of the patent subsequent to Jan. 18, 1982, has been disclaimed
19 Claims. (Cl. 260—94.9)

This invention relates to the polymerization and copolymerization of mono-olefins and di-olefins such as ethylene, propylene, butene-1, styrene, isoprene and butadiene.

This application is a continuation in part of copending application U.S. Serial No. 70,135, filed November 18, 1960, now abandoned which application in turn is a division of U.S. Serial No. 15,815, filed March 18, 1960, also abandoned.

It is a principal object of the present invention to provide a novel process for polymerizing mono- and di-olefins and mixtures thereof.

Other objects of the present invention will in part be obvious and will in part appear hereinafter.

In accordance with the present invention, mono- and di-olefins are polymerized or copolymerized by catalysts comprising (a) a cocatalyst which comprises an inorganic solid having chemically bound to the surface thereof halogenated metals of Group VIIa or VII, and (b) an organometallic compound.

Said cocatalyst can be produced in a number of ways including (as set forth in U.S. Serial No. 70,135) reaction under certain conditions between hydroxyl groups on the surface of an inorganic solid and a halide-type compound of a metal of Group VIIa or VIII. This process of producing said cocatalyst will be described first.

Inorganic solids suitable for the purposes of the present invention generally include any inoragnic compound which is available in finely-divided particulate form with hydroxyl groups on the surface thereof. For example, oxides such as alumina, titania, zirconia, silica, thoria and magnesia, carbon blacks such as channel blacks, silicates such as chrysotile, actinolite and crocidolite, and alumninates such as corundum and bauxite are all generally suitable for the purposes of the present invention provided that said solids have at least about $1 \times 10^{-4}$ equivalents per gram of hydroxyl groups on the surface thereof.

Halide-type compounds of Group VIIa and VIII metals suitable for the purposes of the present invention are the compounds conforming to the general empirical formula:

$$SO_aX_b$$

wherein S is a metal of Group VIIa or VIII (where the group numbers correspond to the Mendeleev Periodic System); O is oxygen; $a$ is a number from 0 to 1; each X is a halogen; and $b$ is a number from 1 to 7.

Examples of suitable compounds conforming to the general formula are halides of Group VIIa and VIII metals such as technetium heptachloride, cobaltous chloride, manganese dichloride, ferric chloride, ferric bromide and cobaltous iodine.

The conditions under which reaction between the Group VIIa or VIII metal halide and the finely-divided inorganic solid can be accomplished are subject to considerable variation. However, in order to obtain a catalyst component with exceptionally high activity and reproducible character and performance, two relatively simple refinements have been found to be all importnat, namely (1) the finely-divided inorganic solid should be essentially dry and anhydrous (i.e. free of molecular water in any form) at the time it is brought into contact with the Group VIIa or VIII metal halide and, (2) special provision should be made to withdraw gaseous by-products of the reaction (for example, HCl) from the reaction mixture. Generally, the said reaction can be carried out by contacting said inorganic solid with said Group VIIa or VIII metal halide, preferably in a solution thereof in an inert hydrocarbon medium, and maintaining the two reactants in intimate contact for a period of time sufficient to effect the desired chemical reaction resulting in the chemical bonding of the Group VIIa or VIII metal to the inorganic solid. The length of time required to effect a given amount of such reaction and chemical bonding is largely dependent upon the temperature of the reaction mixture and the rate of removal of the gaseous by-products. Generally speaking, almost any temperature above about 0° C. can be used satisfactorily, but room temperature or higher will generally be used. Assuming provision is made for intimate contact of the dry inorganic solid and the Group VIIa or VIII metal halide and for active withdrawal of gaseous by-products, such as HCl, the time required to accomplish the chemical reaction needed will vary from periods of the order of hours (i.e. from about 0.5 hour to about 20 hours) at room temperature to periods of the order of minutes (i.e. from about 0.5 to about 20 minutes) at temperatures of 100° C. or over. Temperatures higher than a few hundred degrees centigrade, e.g. 300° C., are completely needless and therefore of little or no interest.

Although use of the Group VIIa or VIII metal halide in liquid or solution form gives excellent results, reaction of the said metal halide with the inorganic solid can be effected if the latter is exposed to vapors of said metal halide at suitable temperatures and if the gaseous by-products are removed. Said vapors can be supplied under their own vapor pressure using a partial vacuum if necessary, or with the aid of a dry inert carrier gas such as nitrogen. This vapor phase treatment can be accomplished in any suitable manner such as by circulating the vapors through the particulate solid in a fixed bed reactor.

Removal of the gaseous by-products of the reaction can be accomplished in many ways, such as (a) by accomplishing the reaction under vacuum, (b) sweeping the reaction vessel with an inert gas such as (dry, oxygen-free) nitrogen, (c) by carrying out the reaction at sufficiently elevated temperatures while stirring to drive off the gaseous by-products, (d) by carrying out the reaction in a refluxing solvent, and (e) by any combination of these.

The accomplishment of an actual chemical reaction between the finely-divided inorganic solid and the Group VIIa or VIII metal halide is of utmost importance in obtaining the exceptionally active and efficient catalyst components described in this invention, e.g. the grams of polymer producible per gram of catalyst employed is generally highly dependent upon the amount of Group VIIa or VIII metal chemically combined with the said inorganic solid. This, in turn, is dependent largely on two main factors, each of which is separately controllable to a large extent. The first factor in question is the molar quantity of hydroxyl groups available on the surface of the inorganic solid per weight of said solid. For an oxide of a given metal, for example, this first factor is largely a matter of (a) the fineness of subdivision of the form in which said oxide is available and (b) the manner in which said oxide was produced, the upper limit clearly being reached when the oxide is ultra fine and the surface thereof is stoichiometrically saturated with hydroxyl groups. The second factor in question is the drawn from the reaction zone for optimum results. It is believed, but there is no intention to be bound by this explanation, that the type of reaction that occurs is correctly illustrated by the following illustrative equation, wherein silicon dioxide serves as the inorganic solid and manganese hexachloride serves as the Group VIIa or VIII metal compound.

Equation 1

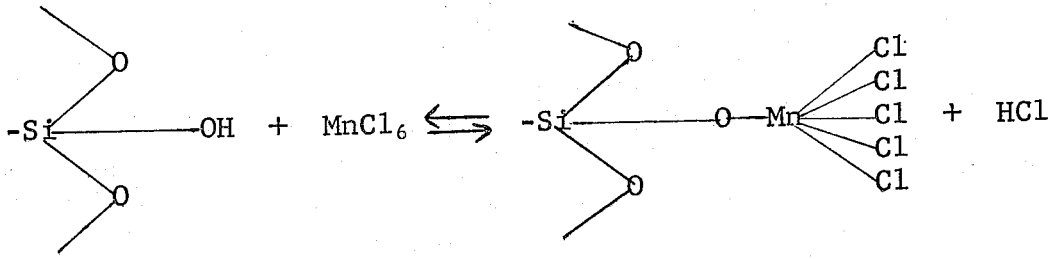

proportion of the said surface hydroxyl groups which are actually chemically reacted with the Group VIIa or VIII metal halide with resultant loss of a gaseous by-product and formation of a chemical linkage of the Group VIIa or VIII metal to the solid.

In view of the above discussion it is clear that in preparing the surface-reacted inorganic solids of the present invention, the smaller the average particle size of the inorganic solid and the larger the quantity of hydroxyl groups on the surface thereof, the greater will be the potential activity and efficiency of the resulting catalyst component producible therefrom. Accordingly, it is important to use as the starting material particulate, finely-divided inorganic solids having an average equivalent particle diameter of less than about 0.1 micron and most preferably less than about 0.05 micron and which have a hydroxyl group content on the surface thereof of at least about $1 \times 10^{-4}$, and preferably at least about $5 \times 10^{-4}$, equivalents per gram of solid. Accordingly, pyrogenic oxides, i.e. oxides produced by the vapor phase oxidation or hydrolysis of a corresponding metal compound are generally greatly preferred.

In short, to reduce this discussion of extent of reaction between the inorganic solid and the Group VIIa or VIII metal halide to the simplest possible terms, it is believed that the surface reacted inorganic solid can best be described and specified as follows: Preferred for imparting optimum catalyst activity and providing maximum catalyst efficiencies when used with a given organometallic compound in a given system are those inorganic solids which have from between about 0.1 and about 5 milliatoms of the Group VIIa or VIII metal chemically attached to the surface thereof per gram of said solid.

Although the mechanism of the reaction between the Group VIIa or VIII metal compound and the inorganic solid is not completely understood, it is known that at temperatures from about 0° C. to about 300° C. and at even higher temperatures, and for periods of time ranging from the order of hours to minutes (in general, the lower the temperature and the slower the withdrawal of by-products, the longer the period of time required), the Group VIIa or VIII metal compound reacts with the hydroxyl groups on the surface of the inorganic solid liberating gaseous by-products such as HCl, which must be with- If the precaution of using a substantially anhydrous inorganic solid and/or removing the gaseous by-products such as HCl, are not observed, then the desired chemical reaction, such as that suggested by the above illustrative equation, either does not occur at all or does not predominate to the extent necessary to produce a superior active catalyst component. Instead products are obtained which are very inferior as catalyst components in that (a) enormously less polymer per gram of catalyst is produced and (b) reaction rates for production of polymer are enormously lower. Apparently, if the gaseous by-products, such as hydrogen chloride, are not removed, retardation and even reversal of the reaction occurs either preventing the formation of the desired product having high catalytic activity, or contaminating it with harmful or inactive components.

Equally important in obtaining the desired reaction product is the use of a dry inorganic solid in the above reaction. Therefore, if the said solid to be used contains molecular water in any form and/or tends to absorb same on exposure to humid atmospheres, etc., it must be dried immediately before use or, after drying, must be maintained continuously out of contact with water vapor until used.

Also, it is pointed out that in order to obtain a catalyst component of the highest possible activity, aside from observing the above important precautions and reaction conditions, it is also recommended that the quantity of Group VIIa or VIII metal halide with which the inorganic solid is contacted be at least approximately sufficient to provide one atom of Group VIIa or VIII metal for each three hydroxyl groups on the surface of the inorganic solid, in order to react all of the active hydroxyl groups possible, since those left unreacted might otherwise tend to deactivate a portion of the organometallic component of the catalyst which will be added subsequently.

Moreover, it is generally desirable to use somewhat more than this minimum amount of Group VIIa or VIII metal halide and to restrict the reaction temperature in order to favor the reactions illustrated by Equations 2 and 3, rather than those illustrated by Equations 5 and 6, which follow, because the products of Equations 2 and 3 are generally substantially more active as catalyst components than are the products of Equations 5 and 6:

Equation 2
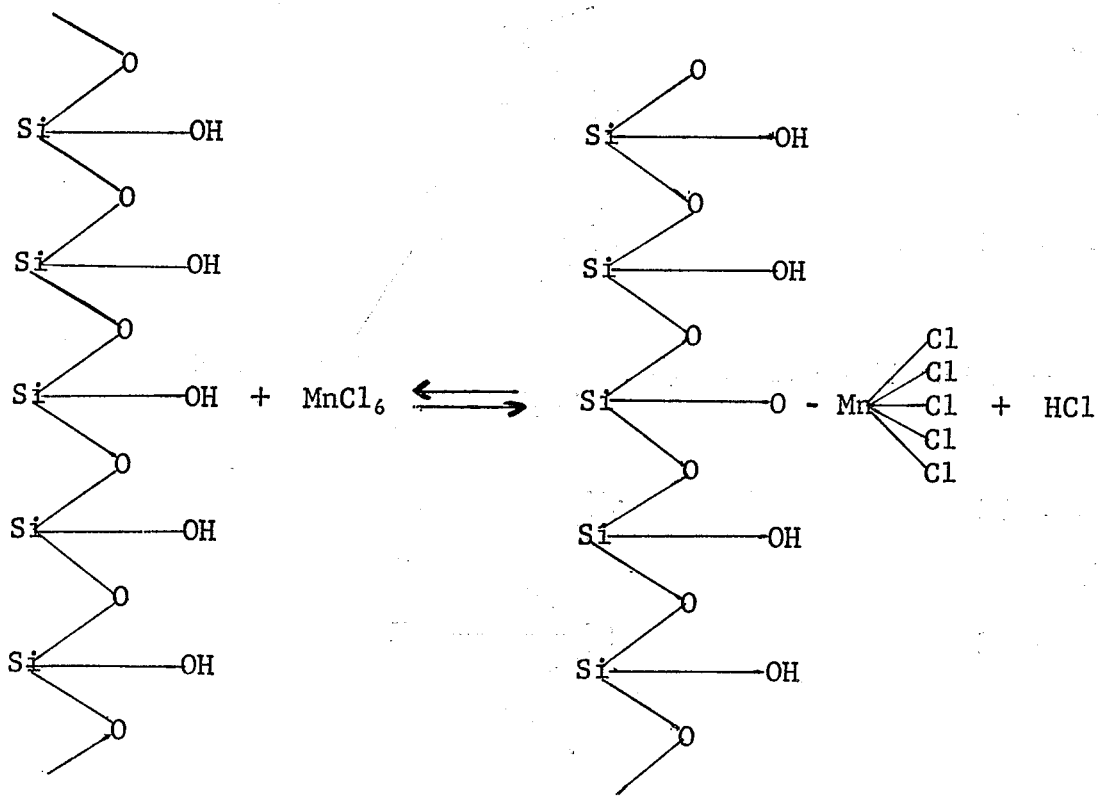
Equation 3
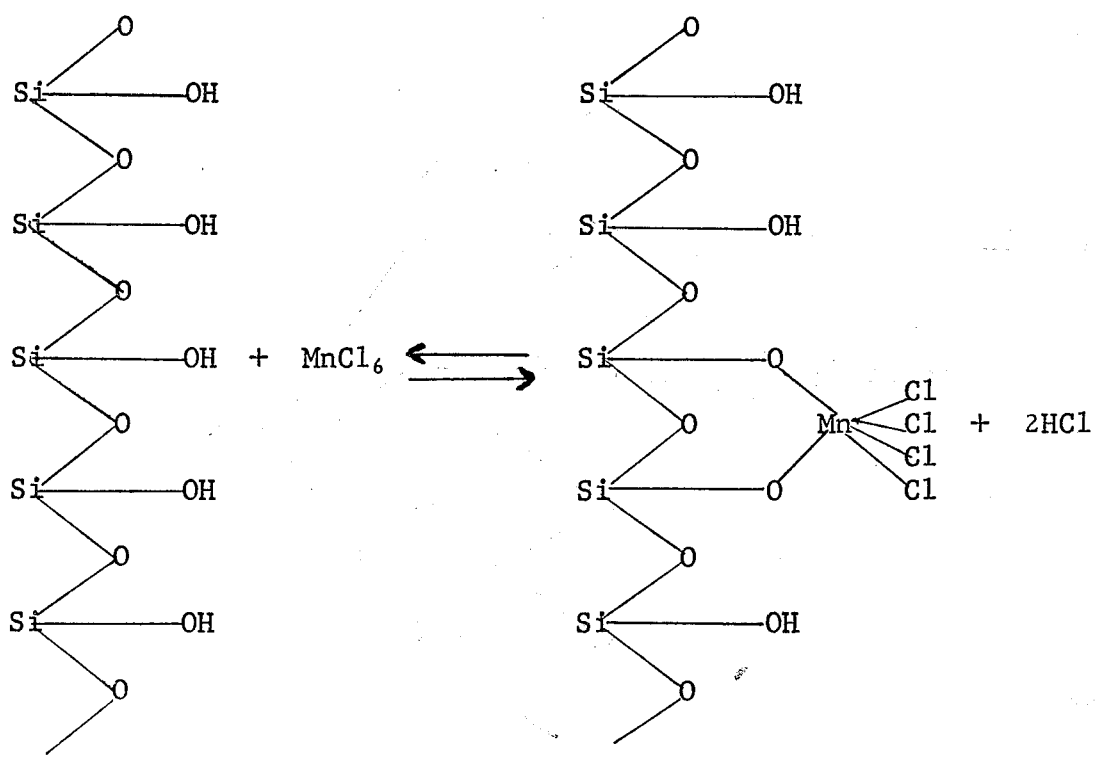

Equation 4
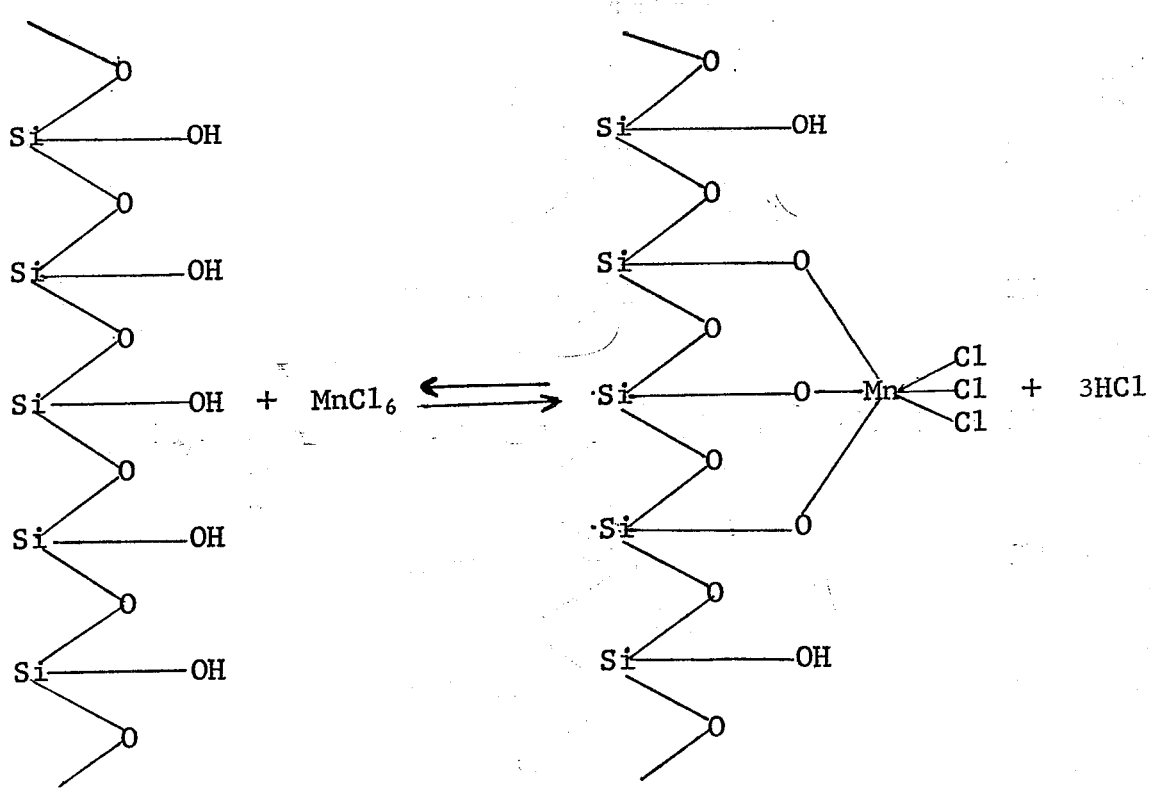
Equation 5
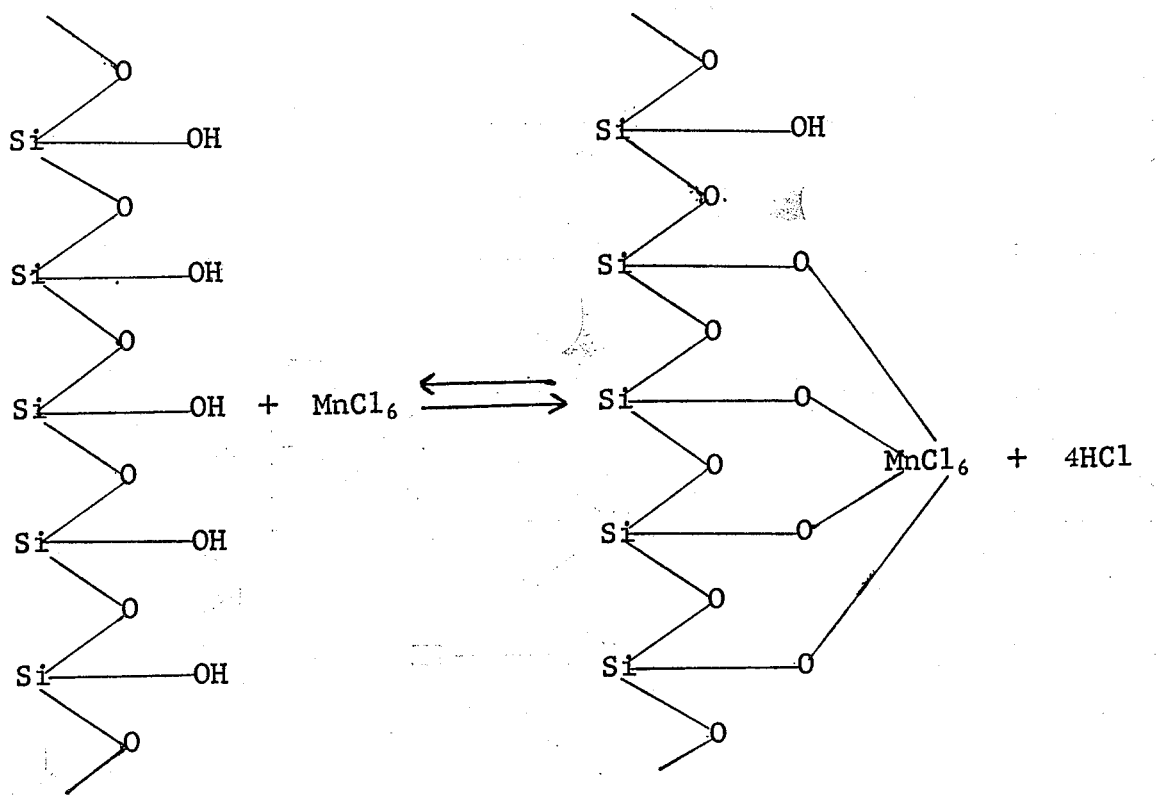

Equation 6

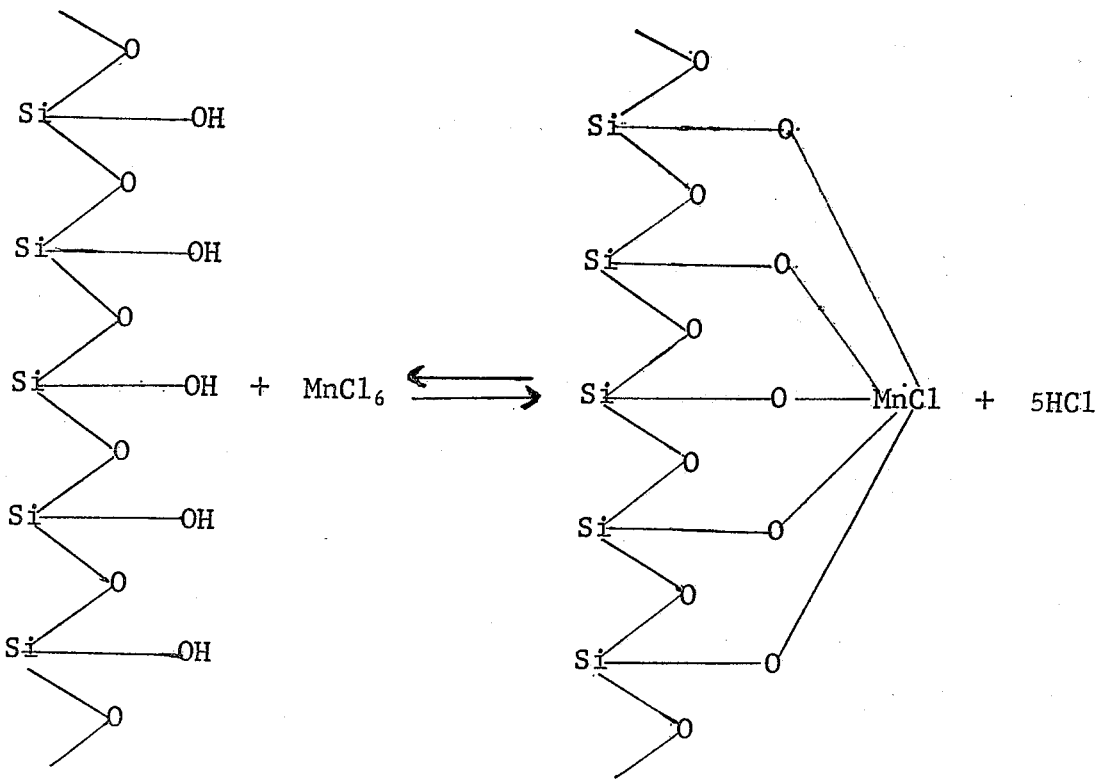

On the other hand, if more Group VIIa or VIII metal compound is introduced than will react, the excess is preferably removed before formation of the polymerization catalyst. Although the excess can be removed by extraction, it is obviously more desirable to avoid such additional steps.

While the above description relates to one method of producing the cocatalysts of the present invention, said cocatalysts are preferably produced by reacting hydroxyl groups on the surface of an inorganic solid with an alkali metal or certain alkali metal compounds (as disclosed in detail in U.S. Serial No. 300,049, filed August 5, 1963, which application is a continuation in part of U.S. Serial. No. 197,231, filed May 24, 1962, now abandoned), and subsequently reacting the resulting product with said Group VIIa or VIII metal halides. A description of this preferred process for producing said cocatalysts is set forth below.

The alkali metals by which is meant, lithium, sodium, potassium, rubidium, cesium and francium, in metallic form are all suitable for the purposes of the present invention. In addition alkali metal compounds conforming to the empirical formula $$M''R$$

whrein M'' is an alkali metal and R is chosen from the group consisting of any monovalent hydrocarbon radical or hydrogen are suitable for the purposes of the present invention.

Specific examples of R groups for substitution in the above formula include methyl, ethyl, n-propyl, isobutyl, n-amyl, isomayl, hexyl, n-octyl, n-dodecyl, and the like; 2-butenyl, 2-methyl-2-butenyl, and the like; cyclopentylmethyl, cyclohexylethyl, cyclopentylethyl, methylcyclopentylethyl, 4-cyclohexenylethyl and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylpenyl, xenyl, naphthyl, methylnaphthyl, dimethylnaphthyl, ethylnaphthyl, and cyclohexylphenyl.

Examples of compounds conforming to the above formula, and which therefore are suitable for the purposes of the present invention, are ethyllithium, hexyllithium, cyclopentadienylsodium, octylpotassium, butyllithium, sodium hydride, cesium hydride and rubidium hydride. Moreover, complexed compounds which conform to the above empirical formula, such as diphenyldilithium and diphenylpotassium lithium are also generally suitable for the purposes of the present invention.

The conditions under which reaction between the alkali metals or alkali metal compounds and the inorganic solid can be accomplished are subject to considerable variation. However, in order to ultimately obtain a cocatalyst with high activity and reproducible character and performance, it has been found to be all important that the inorganic solid be essentially dry and anhydrous at the time it is brought into contact with the alkali metal or alkali metal compound. If the inorganic solid to be utilized contains molecular water in any form and/or tends to absorb same on exposure to humid atmospheres, etc., it must be dried immediately before use, or, after drying must be maintained continuously out of contact with water vapor until utilized. If the precaution of using a substantially anhydrous inorganic solid is not observed, the desired chemical reaction either does not occur at all or does not predominate to the extent necessary to produce a superior cocatalyst.

In the case of the alkali metal compounds conforming to the formula M''R, the reaction is preferably accomplished by contacting the finely-divided inorganic solid with a solution of the alkali metal compound in an inert hydrocarbon reaction medium, and maintaining the two reactants in intimate contact for a period of time sufficient to effect the desired metathetical chemical reaction resulting in the chemical bonding of the alkali metal to the inorganic solid. The length of time required to effect a given amount of such reaction and chemical bonding is largely dependent upon the temperature of the reaction mixture. Generally speaking, any temperature between about 0° C. and about 125° C. can be used satisfactorily, but room temperature or higher will generally be used.

Although use of the alkali metal compounds in liquid or solution form generally gives excellent results, the reaction of the alkali metal compounds with the inorganic solid can also be effected if the latter is exposed to sufficient quantities of the vapors of an alkali metal compound under conditions of time and temperature similar to those discussed above. The vapors of many alkali metal compounds can be supplied under their own vapor pressures using a partial vacuum if necessary, or with the aid of a dry, inert carrier gas such as nitrogen. This vapor phase treatment can be accomplished in any suitable manner such as by circulating the vapors through the particulate inorganic solid in a fixed bed reactor.

In the case of the alkali metals in metallic form, however, reaction with the inorganic solid in a hydrocarbon solution is not generally feasible due to the very low solubility of the alkali metals in most hydrocarbon media. On the other hand, reaction of alkali metal vapors with the inorganic solid is not generally practicable due to the extremely low volatility of the alkali metals. The reaction of alkali metals with the inorganic solid, however, can be accomplished by reacting in an inert hydrocarbon medium the inorganic solid and finely comminuted alkali metal. Briefly, a suitable procedure for accomplishing said reaction comprises placing the inorganic solid and an alkali metal in a hydrocarbon solvent having a boiling point higher than the melting point of the alkali metal, melting the alkali metal by heating the hydrocarbon medium to a temperature above the melting point of the alkali metal but preferably below the boiling point of the hydrocarbon medium, and subsequently comminuting the molten alkali metal, for example, by stirring the hydrocarbon medium with a high speed stirrer. Under these conditions, the alkali metal will react with the hydroxyl groups on the surface of the inorganic solid to produce the cocatalyst intermediates of the present invention.

The accomplishment of an actual chemical reaction of controlled extent between the inorganic solid and the alkali metals or alkali metal compounds is of utmost importance and thus the same limitations as to the choice of the inorganic solid exist for this process of producing the cocatalyst as were described in detail in the aforementioned process.

Although the mechanism of the reaction between the alkali metals or alkali metal compounds and the inorganic solid is not completely understood, it is known that the alkali metals and alkali metal compounds react with the hydroxyl groups on the surface of the inorganic solid liberating by-products such as the corresponding alkane when an alkali metal alkyl is utilized, or hydrogen when an alkali metal or an alkali metal hydride is utilized. It is believed, that the type of reaction that occurs is correctly illustrated by the following illustrative equations, wherein silica serves as the inorganic solid and sodium metal, sodium hydride and lithiumbutyl serve as the alkali metal reactants:

Equation 7

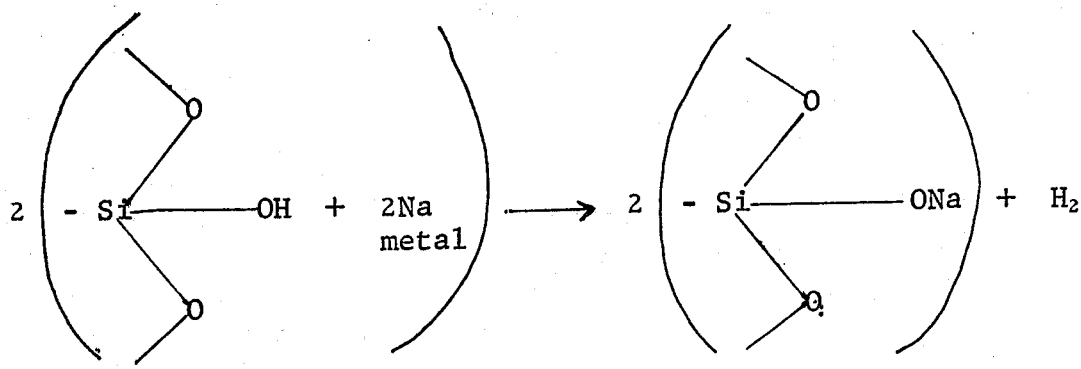

Equation 8

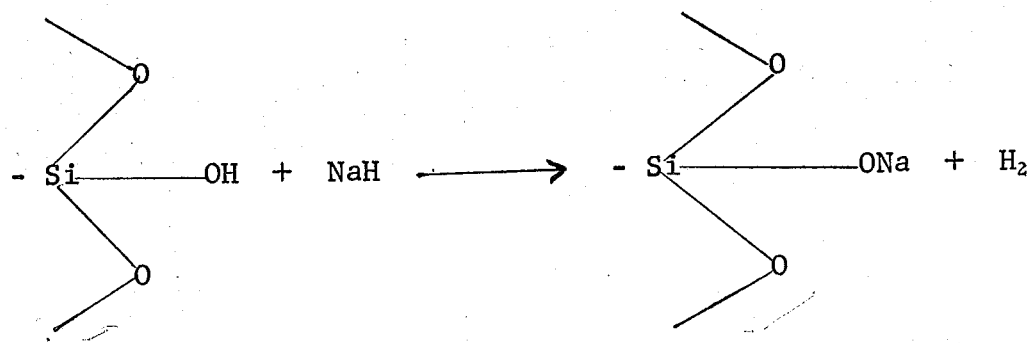

Equation 9

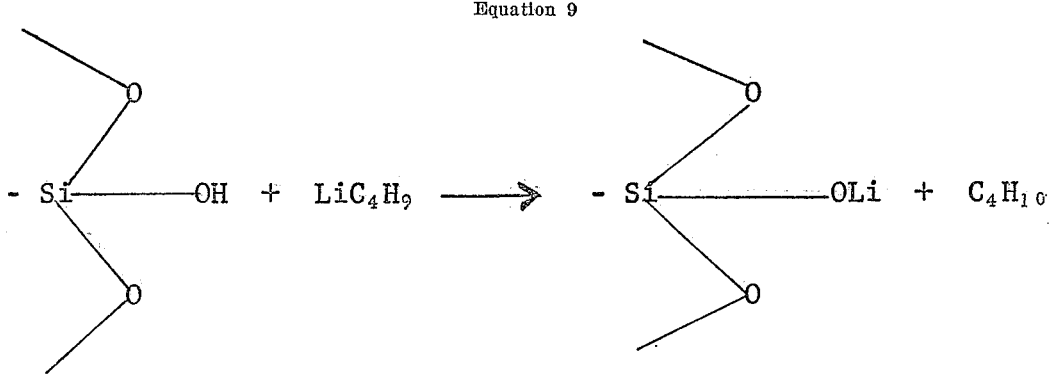

The halide-type compounds (Groups VIIa and VIII halides) aforementioned are entirely suitable for the next step in the preferred process of producing the cocatalysts. Thus, Groups VIIa and VIII metal halides and oxyhalides such as manganese hexachloride, manganese dichloride and ferric chloride are entirely suitable.

The conditions under which reaction between the Group VIIa or VIII metal halide and the finely-divided, alkali metallated inorganic solid can be accomplished are subject to considerable variation. However, as has been previously stated with regard to the formation of the alkali metallated solids, in order to obtain a catalyst component with exceptionally high activity, and reproducible character and performance, it has been found to be all important that the finely-divided alkali metallated solid be maintained essentially dry and anhydrous (i.e. free of molecular water in any form) prior to and at the time it is brought into contact with the transition metal halide. Generally, the said reaction can be carried out by contacting said alkali metallated solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking, almost any temperature between about −10° C. and about 200° C., and even higher temperatures can be used satisfactorily, but room temperature to about 100° C. is generally preferred.

It is believed that the type of reaction that occurs is correctly illustrated by the following illustrative equation, wherein silica bearing chemically bound lithium on the surface thereof serves as the alkali metallated solid and ferric chloride serves as the Group VIIa or VIII halide:

Equation 10

$$SiOLi + FeCl_3 \rightarrow SiOFCl_2 + LiCl$$

It is pointed out, however, that the alkali metals and alkali metal compounds of the present invention are relatively strong reducing agents. Accordingly, when an inorganic solid is utilized which is reducible, for example titanium dioxide, it is extremely important that the quantity of alkali metal or alkali metal compound reacted therewith not exceed that quantity stoichiometrically necessary to react with all hydroxyl groups on the surface of the solid. While said stoichiometric quantity should not be exceeded even when a nonreducible inorganic solid is utilized it is patircularly important, for obvious reasons, to avoid an excess when a reducible solid is utilized. On the other hand, it is generally desirable to add no less than said stoichiometric quantity as any hydroxyl groups left unreacted can subsequently detrimentally affect the performance of the catalyst formed by combining the catalyst component produced with an organometallic compound.

In order to form the catalyst of the present invention, the cocatalyst produced by either of the methods set forth above is combined with an organometallic compound.

Organometallic compounds suitable for the purposes of the present invention are any of the compounds conforming to the general formula:

$$MM'_v X_n R_{y-n}$$

wherein M is chosen from the group consisting of the metals of Groups I, II and III of the periodic table; M' is a metal of Group I of the periodic table; $v$ is a number from 0 to 1; each X is any halogen; $n$ is a number from 0 to 3; each R is chosen from the group consisting of any monovalent hydrocarbon radical and hydrogen; $y$ is a number from 1 to 4; and wherein $y-n$ is at least 1.

Compounds of a single Group I, II or III metal which are suitable for the practice of the invention include compounds conforming to the subgeneric formula:

$$MR'_k$$

wherein M is a Group I, II or III metal, such as lithium, sodium, beryllium, barium, boron, aluminum, copper, zinc, cadminum, mercury and gallium, wherein $k$ equals 1, 2 or 3 depending upon the valency of M which valency in turn normally depends upon the particular group (i.e. I, II or III) to which M belongs; and wherein each R' may be any monovalent hydrocarbon radical. Examples of suitable R' groups include any of the R groups aforementioned in connection with the formula $$M''R$$

Thus, entirely suitable for the purposes of the present invention are the organo-compounds of Groups I, II and III, such as methyl and butyllithium, pentenylsodium, dihexylmercury, diallylmagnesium, diethylcadmium, benzylpotassium, di-p-tolylmercury, diethylzinc, tri-n-butylaluminum, methylphenyl mercury, diisobutyl ethylboron, diethylcadmium, di-n-butylzinc and tri-n-amylboron, and in particular the aluminum alkyls, such as trihexylaluminum, triethylaluminum, trimethylaluminum, and in particular triisobutylaluminum.

In addition, mono-organo-halides and hydrides of Group II metals, and mono- or di-organo-halides and hydrides of Group III metals conforming to the above general formula are also suitable. Specific examples of such compounds are diisobutylaluminum bromide, isobutylboron dichloride, methyl magnesium chloride, phenylmercuric iodide, ethylberyllium chloride, ethylcalcium bromide, hexylcupric chloride, diisobutyaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride.

Also, compounds comprising a Group I, II or III metal compound complexed with a Group I metal compound if they conform to the above general formula, are generally suitable. Examples of such compounds are tetraethyllithium aluminum, tetrahexyllithium aluminum, trihexylpotassium aluminum chloride, triethyllithium aluminum bromide, tributylsodium zinc, tributyllithium zinc, trioctadecylpotassium aluminum hydride, diphenyldilithium and diphenylpotassium lithium.

Although it is appreciated that when R, in the above-defined general formula, does not comprise at least one hydrocarbon radical, the Group I, II and III metal compounds of the present invention cannot normally be termed organometallic compounds lacking at least one hydrocarbon radical comprise such a relatively small number of the total number of compounds included by said general formula that for the purposes of the present invention, it is intended that these compounds be included within the generic term, organometallic compound. Accordingly, in the specification and in the claims, it is intended, and therefore it should be understood, that the term organometallic compound, refers to all the compounds included within the scope of the above-defined general formula.

Using the catalysts of this invention, polymerization of the olefinic charging stock can be accomplished in the absence of liquids, solvents or diluents, for example, in the gas phase, but it is usually easier to effect polymerization in the presence of a substantially inert liquid reaction medium which functions as partial solvent for the monomer, a solvent for the organometallic compound, as a heat transfer agent, and as a liquid transport medium to remove normally solid polymerization products as a dispersion from the polymerization reactor, thus permitting efficient and continuous polymerization operations. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Obviously, these same hydrocarbon media are normally suitable for use where heretofore the use of a hydrocarbon medium has been suggested. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butanes, n-pentane, n-hexane, 2,3 - dimethylbutane, n-octane, isooctane, n-decane, n-dodecane, cyclohexane, methylcyclohexane, dimethylcyclopentane, ethylcyclohexane, decaline, methyldecalins, dimethyldecalins and the like are suitable. Also members of the aromatic hydrocarbon series, such as ethylbenzene, isopropylbenzene, t-butylbenzene, ethyltoluene, ethylxylenes, hemimellitene, pseudocumene, isodurene, diethylbenzene, isoamylbenzene, and particularly the mononuclear aromatic hydrocarbons such as benzene, toluene, xylenes, mesitylene and xylene-p-cymene mixtures, and the like are completely suitable. Aromatic hydrocarbon fractions obtained by the selective extraction of aromatic naphthas, from hydroforming operations such as distillates or bottoms, from cycle stock fractions or cracking operations, etc., and certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons and the like are also suitable.

The proportion of surface-reacted particulate in-organic solid to organometallic compound utilized in preparing the catalyst is not usually a critical feature of the process. Moreover, if this proportion is expressed as a simple molar or weight ratio, it may not be particularly meaningful because, as indicated above, the efficiency of said surface-reacted solids (on weight or molar bases) is highly dependent upon the proportion of Group VIIa or VIII metal halide chemically combined therewith. Accordingly, in order to be most meaningful the relationship between catalyst components should be expressed as a function of the amount of Group VIIa or VIII metal compound which has reacted with the surface of the finely-divided solid. We have found from experience that a molar ratio of from 0.1 to 3 mols of the organometallic compound per mol of Group VIIa or VIII metal chemically combined with the surface of the finely-divided solid is to be preferred.

The quantity of catalyst, i.e. comprising both the surface-reacted finely-divided solid and the organometallic compound, to be utilized in the polymerization reaction may vary, the precise proportion relative to the amount of monomers used being selected in accordance with rate of polymerization desired, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when a very fine particle size oxide is utilized as the inorganic solid.

Harmful impurities in the liquid hydrocarbon reaction medium can be effectively neutralized prior to the formation therein, or addition thereto, of the catalyst or catalyst components by treating the liquid medium with a metal alkyl. The olefinic charging stocks can be purified by any known means such as bubbling said stocks through a solution of a metal alkyl in a hydrocarbon solvent prior to their introduction into the polymerization reactor. The polymerization or copolymerization reaction can be effected at suitable temperatures within the range of from about −25° C. to about 250° C., and pressures ranging from below atmospheric upwardly to any desired maximum pressure, for example, 30,000 p.s.i.g. or even higher pressures.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can be cooled by heat exchange inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative non-limiting examples:

*Example 1*

To a 1000 milliliter, three neck, glass reaction vessel there is added 10 grams of "Alon", a pyrogenic alumina produced by Deutsche Gold- und Silber-Scheideanstalt vormals Roessler, which has an average particle diameter of about 10–40 millimicrons and a hydroxyl group concentration on the surface thereof of about 0.7 milliequivalent per gram. Said reaction vessel is then placed in an oven heated to a temperature of about 110° C., for about 12 hours. Subsequently, the vessel is sealed without exposing said alumina to the atmosphere and there is charged to said vessel 11 millimoles of ferric chloride and 530 milliliters of benzene. The vessel is then heated to and maintained at 80° C., for a period of 10.5 hours, while the HCl produced is continuously removed by sweeping the reaction vessel with purified nitrogen. Subsequently, the extent of the reaction between the alumina and the ferric chloride is determined by measuring the quantity of HCl removed from the vessel and the said alumina is found to have 11 milliatoms of iron bound to the surface thereof. 2.0 grams of this treated alumina containing about 2.2 milliatoms of iron bound to the surface thereof, and suspended in about 106 milliliters of benzene is then transferred from this reaction vessel to a 425 milliliter, stainless steel bomb which has been previously flushed with dry nitrogen. Next, the bomb is charged with ethylene to a pressure of 300 p.s.i.g. Then, 2 millimoles of aluminum triethyl are added and the contents of the bomb are heated to a temperature of about 80° C. and are continuously and vigorously stirred, for about 82 hours while ethylene is introduced into the bomb from time to time as needed to maintain a pressure of about 300 p.s.i.g. The reaction products are analyzed and it is found that about 10 grams of polyethylene have been produced.

*Example 2*

This example is a duplicate of Example 1, except that the alumina is not dried prior to treatment with the ferric chloride. The catalyst is then formed as in Example 1 and utilized in a polymerization reaction as in Example 1. The reaction products are analyzed and it is found that no polyethylene has been produced.

*Example 3*

This example is a duplicate of Example 1, except that (a) during the treatment of the alumina with the ferric chloride the reaction vessel is not continuously swept with a nitrogen stream and (b) the treatment is carried out at room temperature for 30 minutes rather than at 80° C. for 10.5 hours. Following formation of the catalyst and the use thereof in a polymerization reaction, all as described in Example 1, the reaction products are analyzed; it is found that only about 0.5 gram of polyethylene has been produced.

*Example 4*

To a 2000 milliliter, three neck, glass reaction vessel equipped with a stirrer and condenser, there is added 20 grams of "Cab-O-Sil," a pyrogenic silica product by Cabot Corporation, which has an average particle diameter of about 10 millimicrons and a hydroxyl group content on the surface thereof of about 1.5 milliequivalents/gram and 1500 milliliters commercial grade n-heptane. The resulting slurry is then continuously stirred and azeotropically dried for a period of 12 hours during which time about 500 milliliters of a water/n-heptane azeotrope are distilled from the vessel. Next, there is added to said vessel about 25 millimoles of butyllithium dissolved in 250 milliliters anhydrous n-heptane. The vessel is then continuously stirred at ambient temperature for a period of 15 minutes. Subsequently, the extent of the reaction between the butyllithium and hydroxyl groups on the surface of the silica is determined by analyzing the liquid contents of the vessel to insure the absence therein of butyllithium, and the said silica is found to have about 25 milliequivalents of lithium chemically bound to the surface thereof. Next, about 20 millimoles of manganese trichloride dispersed in 250 milliliters of anhydrous n-heptane is added to the alkali metalated silica slurry with continuous stirring at about 50° C. After about one hour the extent of the reaction between the manganese trichloride and the alkali metalated silica is determined by testing the liquid contents of the vessel for the absence therein of manganese trichloride and by analyzing the solid contents of the vessel for lithium chloride and the said silica is found to have 20 milliatoms of manganese chemically bound to the surface thereof. 150 milliliters of this slurry containing about 2 grams of silica to which there is chemically bound about 2 milliatoms of manganese is then transferred from this reaction vessel to a one-gallon stainless steel autoclave, equipped with a stirrer and previously flushed with dry nitrogen. Next, about 2000 milliliters of anhydrous n-heptane and about 4 millimoles triisobutylaluminum are introduced into said autoclave and the autoclave is then continuously agitated and heated to, and maintained at, about 125° C. After about five minutes, ethylene gas is introduced into said vessel to a total pressure of about 800 p.s.i.g. and said pressure is then maintained for about four hours by periodic introduction, as needed, of additional ethylene gas. Upon examination of the products of the reaction, it is found that sold polyethylene has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polymers.

Also, the polymers produced by the process of the present invention, especially the polymers having high specific viscosities can be blended with the lower molecular weight polyethylenes to impart stiffness or other desired properties thereto. The solid resinous products produced by the process of the present invention can, likewise, be blended in any desired proportions with hydrocarbon oils, waxes, with high molecular weight polybutylenes, and with other organic materials. Small proportions between about 0.01 and about 1% of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, can be employed in small proportions to substantially increase the viscosity of liquid hydrocarbon oils and as gelling agents for such oils.

The polymers produced by the present process can also be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be cross-linked to effect increases in softening temperature, etc.

Obviously many changes can be made in the above described examples and procedure without departing from the scope of the invention. For example, although only Group VIIa and VIII chlorides are mentioned in the above examples, bromides, iodides and fluorides are also suitable for the purposes of the present invention.

Also, pyrogenically coformed, or coprecipitated metal oxides, or metal oxides coformed with, or mixed with, other compounds are suitable for the purposes of the present invention although pyrogenically formed and coformed oxides are definitely preferred. It is pointed out that it is intended, and it should be understood, that for the purposes of the present specification and the claims appended thereto, the term, metal oxide, includes silica.

Accordingly, it is intended that the above disclosure be regarded as illustrative and as in no way limiting the scope of the invention.

What we claim is:

1. A process for polymerizing a substance chosen from the group consisting of a mono-olefin, mixtures of mono-olefins, a di-olefin, mixtures of di-olefins and mixtures thereof, which comprises contacting said substance at temperatures between about −25° C. and about 250° C. with a catalyst comprising (a) a finely-divided inorganic solid having an average particle diameter of less than about 0.1 micron and carrying in chemical combination on the surface thereof at least about $1 \times 10^{-4}$ equivalents per gram of structures conforming to the formula $$SO_aX_b$$

wherein S is a metal chosen from the group consisting of the metals of Group VIIa and period 4 of Group VIII; O is oxygen; $a$ is a number from 0 to 1; each X is any halogen; $b$ is a number from 1 to 7; and where said structures are chemically linked directly from S to at least one oxygen atom in the surface of said solid, and (b) a compound conforming to the general formula $$MM'_vX_nR_y$$

wherein M is chosen from the group consisting of the metals of Groups I, II and III; M' is a metal of Group I; $v$ is a number from 0 to 3; each R is chosen from the group consisting of any monovalent hydrocarbon radical and hydrogen; and $y$ is a number from 1 to 4.

2. The process of claim 1 wherein in said formula $$SO_aX_b$$

$a$ is 0.

3. The process of claim 1 wherein in said formula $$SO_aX_b$$

each X is chlorine.

4. The process of claim 1 wherein in said formula $$SO_aX_b$$

S is a metal of Group VIIa.

5. The process of claim 1 wherein in said formula $$SO_aX_b$$

S is manganese.

6. The process of claim 1 wherein in said formula $$SO_aX_b$$

S is a metal of period 4 of Group VIII.

7. The process of claim 1 wherein in said formula $$SO_aX_b$$

S is iron.

8. The process of claim 1 wherein in said formula $$SO_aX_b$$

S is cobalt.

9. The process of claim 1 wherein in said formula $$SO_aX_b$$

S is nickel.

10. The process of claim 1 wherein said finely-divided inorganic solid is a metal oxide.

11. The process of claim 1 wherein said finely-divided inorganic solid is a metal oxide chosen from the group consisting of alumina and silica.

12. The process of claim 1 wherein said finely-divided inorganic solid is a pyrogenic silica having an average particle diameter below about 0.05 micron and carrying in chemical combination on the surface thereof at least about $5 \times 10^{-4}$ equivalents per gram of said structures.

13. The process of claim 1 wherein in said formula $$MM'_vX_nR_y$$

each X is chlorine.

14. The process of claim 1 wherein in said formula $$MM'_vX_nR_y$$

$n$ is 0.

15. The process of claim 1 wherein in said formula $$MM'_vX_nR_y$$

$v$ is 0, $n$ is 0, and each R is any alkyl group.

16. The process of claim 1 wherein in said formula $$MM'_vX_nR_y$$

M is aluminum, $v$ is 0, and $n$ is 0.

17. The process of claim 1 wherein in said formula $$MM'_vX_nR_y$$

M is aluminum, $v$ is 0, $n$ is 0, and each R is any alkyl group.

18. The process of claim 1 wherein the substance polymerized is an α-mono-olefin.

19. The process of claim 1 wherein the substance polymerized is ethylene.

References Cited by the Examiner

UNITED STATES PATENTS

| 2,996,459 | 8/1961 | Andersen et al. | 260—94.9 |
| 2,999,074 | 9/1961 | Bloch et al. | 252—441 |

FOREIGN PATENTS

| 823,024 | 11/1959 | Great Britain. |
| 592,111 | 7/1959 | Italy. |

JOSEPH L. SCHOFER, *Primary Examiner.*